(12) United States Patent
Maloney et al.

(10) Patent No.: US 11,631,066 B2
(45) Date of Patent: Apr. 18, 2023

(54) DIGITAL DERIVATIVES IN BLOCKCHAIN ENVIRONMENTS

(71) Applicant: Themys

(72) Inventors: Michael Maloney, New York, NY (US); Jonathan Mohan, New York, NY (US)

(*) Notice: Subject to any disclaimer, the term of this patent is extended or adjusted under 35 U.S.C. 154(b) by 0 days.

(21) Appl. No.: 16/409,916

(22) Filed: May 13, 2019

(65) Prior Publication Data
US 2020/0364682 A1 Nov. 19, 2020

(51) Int. Cl.
*G06Q 40/00* (2023.01)
*G06Q 20/10* (2012.01)
*H04L 9/06* (2006.01)
*G06Q 20/06* (2012.01)

(52) U.S. Cl.
CPC ......... *G06Q 20/102* (2013.01); *G06Q 20/065* (2013.01); *G06Q 40/00* (2013.01); *H04L 9/0637* (2013.01); *H04L 9/0643* (2013.01); *H04L 2209/38* (2013.01); *H04L 2209/56* (2013.01)

(58) Field of Classification Search
CPC .................................................. G06Q 40/00
See application file for complete search history.

(56) References Cited

U.S. PATENT DOCUMENTS

2014/0046818 A1* 2/2014 Chung ............... G06Q 40/00 705/35
2015/0287026 A1* 10/2015 Yang ................. G06Q 20/06 705/69

OTHER PUBLICATIONS

Mauro Conti, Sandeep Kumar, Chhagan Lal, and Sushmita Ruj, A Survey on Security and Privacy Issues of Bitcoin, Dec. 25, 2017, IEEE, web, p. 1-10 (Year: 2017).*

* cited by examiner

*Primary Examiner* — I Jung Liu
(74) *Attorney, Agent, or Firm* — Scott P. Zimmerman, PLLC

(57) ABSTRACT

A digital derivative is a cryptographic- and blockchain-based financial product that governs capital investments in blockchain mining infrastructure. The digital derivative resembles a bond financial product that utilizes blockchain protocols for principal, interest, and payment aspects. A secured hashrate is delivered by the issuer for the lifetime of the digital derivative. Income is generated in the cryptocurrency being mined, and the issuer may elect (prior to issuance) to repay the principal in the mined cryptocurrency. A cryptographic variable interest rate is calculated in the mined cryptocurrency based on the secured hashrate and a protocol-reported network difficulty.

16 Claims, 15 Drawing Sheets

DIGITAL DERIVATIVES IN BLOCKCHAIN ENVIRONMENTS

BACKGROUND

An open and permissionless blockchain consists of three (3) key elements: the protocol, a decentralized peer-to-peer network; the blockchain itself, a public ledger of all transactions; and the consensus method, a set of rules for validating transactions and coordinating global agreement on the order of blocks in the chain.

Bitcoin refers to both the first implementation of blockchain technology, as well as the underlying protocol of that network. The first transactions on the Bitcoin network occurred in 2009, and the network has continued to run with zero downtime since inception.

Bitcoin, as well as several other blockchain protocols, reaches global consensus and validates transactions through a method known as Proof-of-Work (POW) mining. This method creates a "competition" between participants on the network to solve a mathematical problem while simultaneously ordering bitcoin transactions. While requiring dedicated computational power, this mathematical problem, once solved, is easily verifiable—and serves as the "proof" that computational work has been undertaken.

The Bitcoin protocol algorithmically changes the difficulty of solving this problem, in an attempt to force the network to find one block every 10 minutes. As more participants compete to solve the problem, the difficulty increases to maintain this 10-minute blocktime.

What began as a cottage industry of participants mining with personal computers, has grown into a multi-billion-dollar market. Manufacturers have begun to build dedicated ASIC hardware to solve these Proof-of-Work consensus problems, and expansive mining farms have sprung up in areas with cheap electricity. The demand for Bitcoin, and similarly with other POW coins, has led to greater investments into mining, with new equipment and sites costing tens of millions of dollars to establish.

SUMMARY

Themys, a company dedicated to mitigating on-chain systemic risk, has developed a unique financial product that aligns the interest of investors and miners with three basic propositions. First, as crypto mining and traditional mineral mining share similar speculative and finite resources, capital should be raised as a simple bond or debenture. This provides miners the operating capital necessary without diluting equity, while repaying investors over a short period of time and minimizing counterparty risks associated with equity investment.

Second, the debt may be tied to the income generated. In this case, the mined cryptocurrency provides direct payment for the underlying debt. By paying obligations in the mined cryptocurrency, miners avoid secondary fees. Investors, on the other hand, are provided safe exposure to "clean" cryptocurrencies without the uncertainty and counterparty risks of purchasing circulating coins.

Last, miners and investors may both share in the markets upside while reducing downside risks. An innovative methodology to calculate variable interest rate provides relief to miners when network hashrate rises, while providing increased returns of cryptocurrency to investors when prices decrease.

These elements make up the Themys Hashrate Bond, a cryptographic- and blockchain-based financial product that addresses the most clear blockchain systemic risk with a straightforward, classically understood, investment. The Themys Hashrate Bond innovates upon prior financial products by seamlessly incorporating blockchain technology. This allows the product to fully utilize blockchain protocols for all aspects of a bond's lifecycle, and can therefore be considered the first of its kind digital derivative.

These bonds functionally securitize three enforceable agreements between issuer and investor; the principal amount being borrowed, as well as the use of these funds; the calculation of interest repayment in addition to payments made on the principal; the secured hashrate that must be delivered by the issuer for the lifetime of the bond, providing network support to the chosen blockchain protocol.

Principal funds are primarily used to purchase, acquire, install, and maintain cryptocurrency mining equipment. As cryptocurrency mining is a competitive space with intensive capital costs, this product provides much needed non-dilutive capital to enhance and upgrade facilities. Since the resulting capital investment produces income in the cryptocurrency being mined, the Themys Hashrate Bond allows issuers to elect (prior to issuance) to repay the principal in the mined cryptocurrency.

Interest payments are made in the mined currency, ensuring both the issuers ability to repay, as well as providing secondary exposure to cryptocurrency's for investors who purchased a bond with principal denominated in USD. Interest payment rate utilizes the secured hashrate and protocol reported network difficulty, allowing for a variable interest rate that lowers as issuer returns diminishes, but rises in the event of reduced network difficulty. Further engineering with this principal applies a de minimis fixed rate and adjusts based on the expected blocks found during a period. The formula is as follows:

$$STH\ APY = \text{Fixed Rate} + \left\{\left[\left(\frac{\text{Secured Hashrate}}{\text{Target Hashrate}}\right) \times \text{Blocks in Period}\right] \times \text{Adjustment Rate}\right\}$$

Secured hashrate is provided by the operation of the purchased mining equipment, and provides the means to earning block rewards of cryptocurrency for issuers. The secured hashrate can be accurately approximated directly from on-chain data, and is used to validate the purchased equipment through use of funds as well as ensure the secured hashrate minimums are being met. The formula is as follows:

$$\text{Secured Hashrate} \approx \frac{\sum \text{Signatures}_n \times \overline{\text{Difficulty}_n}}{\text{Blocks}_n}$$

Themys Hashrate Bonds repayment schedule, as a result of being a digital derivative based on blockchain, is based upon the block height and blocktime of the protocol. While this causes some small adjustments in 180/360 accounting systems, the vast majority of (98%+) repayments will occur prior to the originally scheduled delivery—and there is a statistical improvability (>0.0001%) of a repayment occurring outside of the 28-day window for physical delivery (used for cryptocurrencies and commodities).

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 8-9A, 9B, 9C, and 9D illustrate a difficulty, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
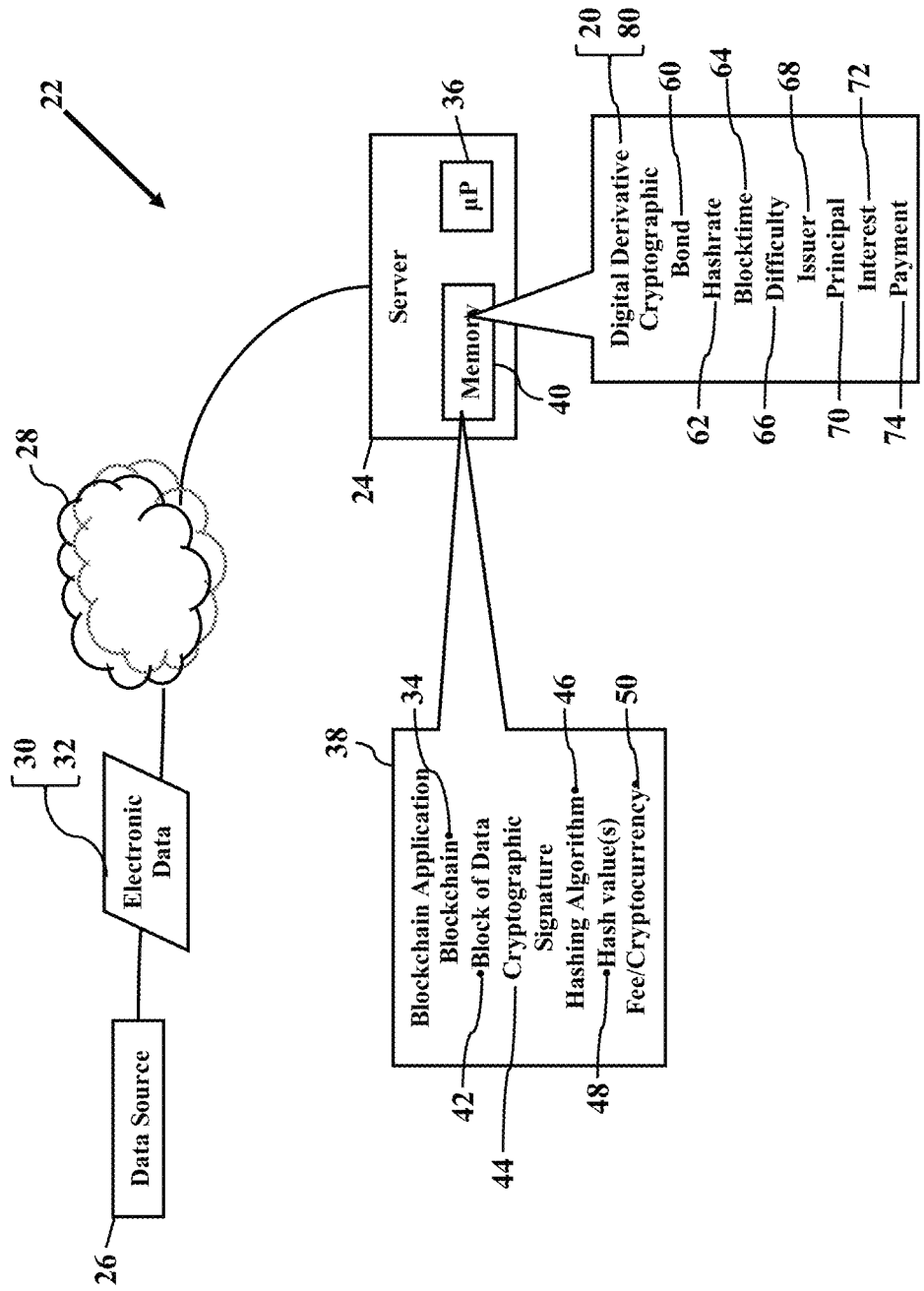
FIG. 1 illustrates a digital derivative in a blockchain environment, according to exemplary embodiments.

FIG. 1 illustrates a digital derivative 20 in a blockchain environment 22, according to exemplary embodiments. A server 24 communicates with a data source 26 via a communications network 28. The data source 26 sends electronic data 30 sent via the communications network 28 to a network address (such as an Internet protocol address) associated with the server 24. In the blockchain environment 22, the electronic data 30 represents a transaction 32 that is recorded to a blockchain 34. That is, the server 24 has a hardware processor 36 that executes a blockchain application 38 stored in a memory device 40. The blockchain application 38 causes the server 24 to record the transaction 32 to a block 42 of data. At the end of some period of time (such as ten minutes), the server 24 then generates a cryptographic signature 44 that represents the transaction(s) 32 written to the block 42 of data. While the server 24 may utilize any cryptographic scheme or formula, many readers are thought familiar with hashing. The server 24 retrieves or calls an electronic representation of a hashing algorithm 46 stored in the memory device 40. The server 24 executes the blockchain application 38 to "mine" the block 42 of data by applying the hashing algorithm 46 to generate one or more hash values 48. The hash value(s) 48 represent a proof-of-work that the server 24 hashed or "mined" the block 42 of data. The blockchain application 38 may then instruct the server 24 to record the hash values 48 to the blockchain 34. The server 24 may then be rewarded or otherwise compensated for mining the block 42 of data. The server 24, for example, may receive a transaction fee and/or a cryptocurrency 50 in exchange for mining the block 42 of data. The concept and process for blockchain mining is generally known and need not be explained in detail.

Mining often requires hundreds or thousands of servers. Because blockchain usage has tremendously grown, today's mining operations have grown into a multi-billion-dollar market requiring great capital investment. Manufacturers have begun to build dedicated ASIC hardware to solve these Proof-of-Work consensus problems, and expansive mining farms have sprung up in areas with cheap electricity. The demand for Bitcoin, and similarly with other POW coins, has led to greater investments into mining, with new equipment and sites costing tens of millions of dollars to establish. Cryptomining operations have thus far been traditionally self-financed or raised capital through the sale of equity. Due to the constantly increasing difficulty of blockchain networks, as well as the high costs to purchase and maintain the latest ASIC equipment, equity sales are particularly unappealing as a single influx of capital.

FIG. 1 thus illustrates the digital derivative 20. The digital derivative 20 is a cryptographic bond 60 that is based at least partially on a hashrate 62 in the blockchain environment 22. The hashrate 62 (whether actual, target, or desired values) is the estimated number of hashes necessary to find a block solution at an estimated blocktime 64. A target hashrate 62 is a function of mining difficulty 66, and represents the implied total network computations necessary to find a new block solution. The digital derivative 20 is associated with an issuer 68 for a borrowed or principal amount 70 according to an interest 72 and payment schedule 74. Principal funds are primarily used to purchase, acquire, install, and maintain cryptocurrency mining equipment. As cryptocurrency mining is a competitive space with intensive capital costs, the digital derivative 20 provides much needed non-dilutive capital to enhance and upgrade facilities. Since the resulting capital investment produces income in the cryptocurrency being mined, the digital derivative 20 allows issuers to elect (prior to issuance) to repay the principal in the mined cryptocurrency 50.

The digital derivative 20 may thus be a Themys Hashrate Bond 80. The Themys Hashrate Bond 80 is a cryptographic and blockchain product that addresses the most clear blockchain systemic risk with a straightforward, classically understood, investment. Interest payments are made in the mined currency, ensuring both the issuers ability to repay, as well as providing secondary exposure to cryptocurrency's for investors who purchased a bond with principal denominated in USD. Interest payment rate utilizes the secured hashrate 62 and protocol reported network difficulty 66, allowing for a variable interest rate 72 that lowers as issuer returns diminishes, but rises in the event of reduced network difficulty 66. Further engineering with this principal applies a de minimis fixed rate and adjusts based on the expected blocks found during a period.

The network mining difficulty 66 refers to the likelihood of finding a valid hash below a certain target number, and is recorded in the block header of every block in a Proof-Of-Work blockchain. Typically, as in the case of Bitcoin and Ethereum, the difficulty is stored in the header as a packed representation referred to as bits. These bits are short hand for the actual hexadecimal target, derived via specific formulas in each protocol.

The formula for a Stepped Hashrate (STH) APY is as follows:

$$STH\ APY = \text{Fixed Rate} + \left(\left[\left(\frac{\text{Secured Hashrate}}{\text{Target Hashrate}}\right) \times \text{Blocks in Period}\right] \times \text{Adjustment Rate}\right)$$

Secured hashrate 62 is provided by the operation of the purchased mining equipment, and provides the means to earning block rewards of cryptocurrency 50 for issuers. The secured hashrate 62 can be accurately approximated directly from on-chain data, and is used to validate the purchased equipment through use of funds as well as ensure the minimum value of the secured hashrate 62 is/are being met. The formula is as follows:

$$\text{Secured Hashrate} \approx \frac{\sum \text{Signatures}_n \times \overline{\text{Difficulty}_n}}{\text{Blocks}_n}$$

The Themys Hashrate Bond 80 is associated with a repayment schedule, as a result of being a digital derivative based on the blockchain 34, is based upon the block height and a blocktime 64 of the protocol. The blocktime (whether desired, actual, or target values) is the desired time between each found block in the blockchain 34. Blocktime 64 and Difficulty 66 are closely related, and the difficulty of a network is adjusted up and down based on the desired blocktime 64. While this causes some small adjustments in 180/360 accounting systems, the vast majority of (98%+) repayments will occur prior to the originally scheduled delivery—and there is a statistical improvability (>0.0001%) of a repayment occurring outside of the 28-day window for physical delivery (used for cryptocurrencies and commodities).

The Themys Hashrate Bond 80 thus reflects the rise of digital cryptocurrencies in the financial services sector, with a huge number of trading, hedge, venture, and other banking firms organizing to service (and profit from) this new market. Often overlooked by these finance professionals are cryptocurrency miners—the teams that validate transactions on blockchain protocols and receive in-kind block rewards and transaction fees. These companies provide the hashrate necessary for Proof-of-Work blockchain protocols to function, and assume the operating expenses to support the network. As specialized equipment and ever-increasing network hashrate eats into costs, miners seeking to expand operations face large capital requirements. Unfortunately, these costs are denominated in USD while their income is produced in (often volatile) cryptocurrencies.

While the traditional financial history of bonds and debt financing is exceedingly well understood, these products have only been minimally explored for blockchain technology. Themys, in our effort to mitigate systemic risk in blockchain networks, has expanded upon the simple bond to meet both the financial and technical needs of blockchain technology.

The Themys Hashrate Bond 80 is designed to align the interest of multiple parties participating on a blockchain network. By providing benefits and reasonable costs for all, the Themys Hashrate Bond 80 provides greater market expansion for a blockchain protocol.

The Themys Hashrate Bond 80 follows in the vein of traditional precious minerals mining—and speculative mining efforts are almost universally funded by debt. Unlike physical mining, however, blockchain mining has a known and calculable return rate.

As blockchain miners also support the public network, the Themys Hashrate Bond 80 also utilizes a level-debt structure akin to municipal bonds. This splits interest and principal payments across a pre-determined and agreed upon payment plan, minimizing the miners' risk of experiencing a sudden payment hike.

Individual and institutional investors that hold large quantities of a singular cryptocurrency 50 have increased exposure to so-called 51% and eclipse attacks. Their holdings, even when in cold-storage, will see negative price impacts if an attack is made on the network. As will be shown later, there is also a strong relationship between network hashrate and market price, suggesting that large holders of cryptocurrency should be well served in maintaining a high network hashrate.

Those who maintain a long position in crypto will also benefit by earning an interest on the investment. By maintaining some of their positions in Themys Hashrate Bonds 80, these holders are able to generate returns in the desired cryptocurrency 50 that are fully traceable and untainted (i.e. "clean coin"). In addition, unlike a savings or lending account (which may not be available at a competitive rate for large holders), Themys Hashrate Bonds 80 provide both a high-rate of return and secure the underlying protocol.

Themys Hashrate Bonds 80 are in many ways akin to the rewards offered by Proof of Stake (POS) networks: by securing the network and validating transactions, coins are rewarded in a traceable manner from the block-award. Unlike a POS system, Themys Hashrate Bonds 80 are fully enforceable by law and are not subject to the potential technical risks of having holdings "slashed" by error.

Many traditional investors, such as low-risk firms and family offices, have shown keen interest in blockchain cryptocurrencies, but have not been able to directly invest due to uncertain regulatory actions and perceived risks. These investors have been limited to purchasing trusts and other secondary products that follow the price of a cryptocurrency.

Themys Hashrate Bonds 80 provide a true secondary exposure for investors seeking to invest into blockchain technology. With a competitive interest rate denominated in the underlying cryptocurrency 50, investors are able to outperform a hold only strategy. From a regulatory perspective, the ability to receive interest payments in cryptocurrency 50 that has a fully traceable ownership history minimizes KYC/AML risks in the sale.

Themys Hashrate Bonds 80, as a traditional bond instrument, are also able to be rolled into secondary funds and other products. This allows traditional investors to structure their investments into Themys Hashrate Bonds 80 through other brokers, and even establish a sales relationship with purchasers of cryptocurrency 50 to transfer their interest payments into USD at low- or no-cost.

The necessity and impact of network hashrate 62 for cryptocurrencies is often overlooked or taken for granted in a number of blockchain applications. Unlike traditional banking systems that rely upon operator or government owned (and therefore legally responsible) networks, public blockchain protocols are supported by a network of participants (in most cases, miners). Therefore, the onus to support and maintain a healthy network is on the users, especially service providers.

Service providers that support transactions and custody should maintain network hashrate 62 to minimize their exposure to 51% and Eclipse attacks. For example, custodians that maintain cryptocurrency 50 in "cold storage" are still susceptible to a 51% attack that provides false transactions to move coins in their control. By raising the total network hashrate 62 through a Themys Hashrate Bond 80, custodians can effectively raise the cost of a network attack and reduce their exposure.

Similarly, exchanges and other service providers that require a validating node for monitoring on-chain activity and broadcasting/receiving transactions would be well-served through a Themys Hashrate Bond 80. By securing hashrate 62 through a miner, these services have a direct provider of on-chain data that they maintain a security instrument with. These mining facilities already validate every transaction through the network, and therefore provide a solid source of data.

Figure 2:
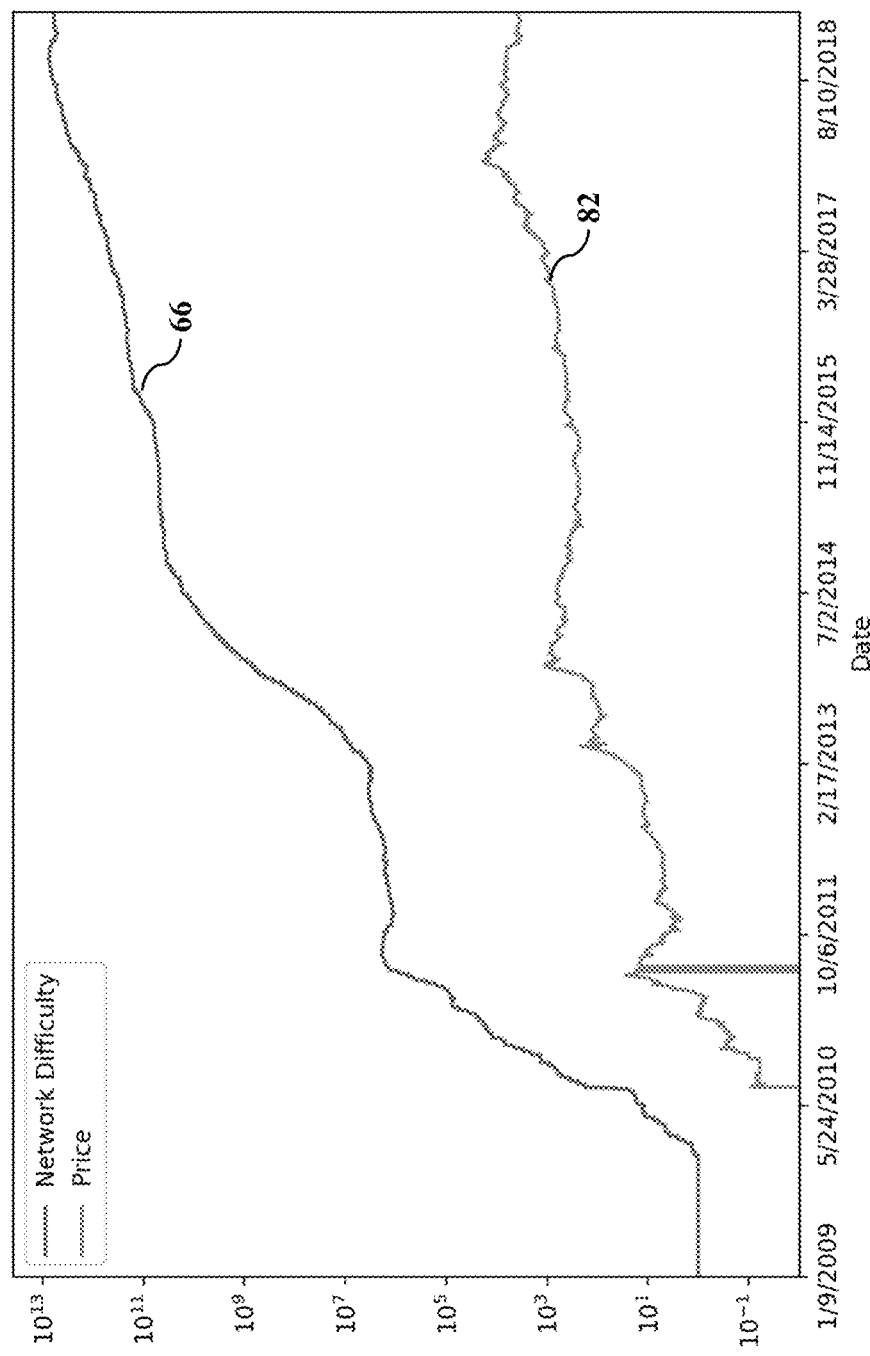
FIG. 2 is a graph of calendar dates, price, and network difficulty, according to exemplary embodiments.

FIG. 2 is a graph of calendar dates, price 82, and network difficulty 66, according to exemplary embodiments. As cryptocurrency prices have increased, the market for crypto mining has exploded. Numerous investors and entrepreneurs have entered the space, creating an ever-increasing arms race for mining equipment and providing hashrate 62. The chart of FIG. 1 thus shows that there is a strong relationship between the log of the network hashrate 62 and coin price 82 by calendar date. Historically, this has resulted in an increasing network hashrate 62 increase of roughly 7% a month—but this is subject to great volatility. To maximize profits, miners will switch between mining a number of coins based on their projected reward and value. While this maximizes the short-term profit, it also contributes substantially to market volatility and increases a cryptocurrency's susceptibility to attack.

Further analysis of Bitcoin's network difficulty 66, total hashrate 62, and price 82 reveals a stronger correlation (≈0.96 for hashrate variables and price) than the S&P's historic average (≈0.95). This very strong correlation suggests that securing hashrate for a cryptocurrency, in this case Bitcoin, could provide a strong stabilizing effect on price. The below Table 1 provides the Spearman correlation of Network Difficulty, Total Hashrate, and Price.

TABLE 1

| Spearman correlation of Network Difficulty, Total Hashrate, and Price | | | |
|---|---|---|---|
|  | Network Difficulty | Total Hashrate | Price (USD) |
| Network Difficulty | 1.000000 | 0.998748 | 0.961648 |
| Total Hashrate | 0.998748 | 1.000000 | 0.961152 |
| Price (USD) | 0.961648 | 0.961152 | 1.000000 |

This correlation also provides some price protection mechanisms to the Themys Hashrate Bond 80: a small decline in a cryptocurrency's price 82 would lead to a small decline in the total hashrate 62 of the network. Under narrow conditions, this would lead to a higher rate of interest 72 for the bond, making up some of the return difference.

Figure 3:
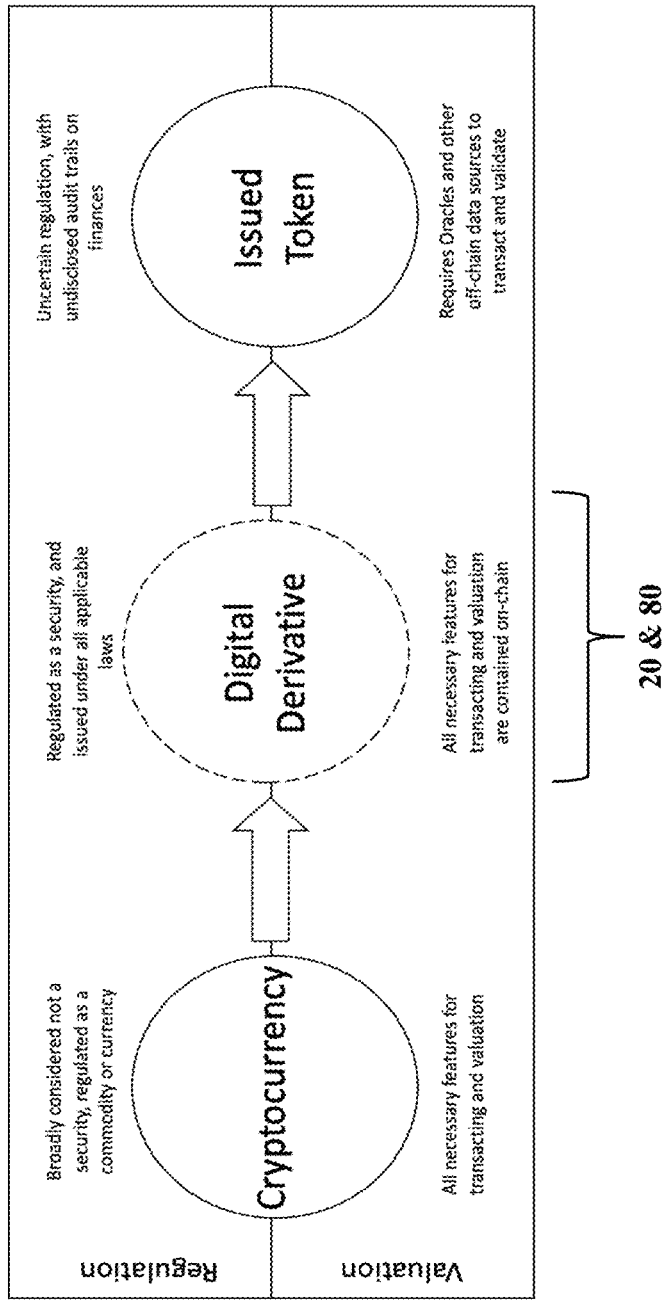
FIG. 3 illustrates different types of digital assets, according to exemplary embodiments.

FIG. 3 illustrates different types of digital assets, according to exemplary embodiments. The native cryptocurrency 50 of a blockchain 34 are referred to as coins, and are uniquely digital assets in financial markets. All required aspects for their proper use are contained on-chain; from sending a transaction, validating and confirming a transfer, to "paying" out rewards to miners for their work on a network. Since no other information is required from off-chain resources, cryptocurrencies can take full advantage of blockchain technology.

Financial experts and computer engineers alike have attempted to develop new financial products that maintain some aspects of cryptocurrencies (blockchain interaction, transaction as execution, reduced settlement) while incorporating ownership records and trade information not available on-chain. These efforts rely upon difficult to implement and verify "oracle" services, that are not trustless like blockchain.

Oracles fail to provide data surety, in-part, because the information they provide is not created and secured by the blockchain protocol itself. For example, while an oracle service may have redundancies in place, the information provided originates off-chain and therefore its authenticity cannot be guaranteed by independent blockchain nodes. Similarly, an attacker may be able to alter the originating data without the oracle network even knowing.

The digital derivative 20 is thus an intermediary digital asset; one that leverages on-chain data for its use and valuation, derives its underlying value from a cryptocurrency, and is clearly regulated as a financial security. These products avoid the problems of oracles or other off-chain requirements that tokens have, and instead can be sold and traded with the simplicity of any other native blockchain cryptocurrency.

The Themys Hashrate Bond 80 is the first natively digital derivative 20, meaning it derives all of its value and required financial information directly from the blockchain 34 of the cryptocurrency 50 being mined. With interest denominated in principal, there is no need for an oracle to provide data on exchange values or rates.

The interest rate for the Themys Hashrate Bond 80 comes from using the network difficulty 66 as reported in the blockchain protocol's blockheader—80 bytes of hexadecimal data included in every newly formed block as an identifier, and includes data to validate and extend the blockchain 34. Below is a table showing the elements of Bitcoin's standard blockheader (for block #570931):

TABLE 2

Bitcoin Block header contents for block #570931
00e00020f7ea7e31a1c1937b524948741e46f5462249be8f6ce41f000000000000000000c34327584 818a730635e7379343d4331662e8f8c89dba3f0b242f51743b246f8a802ad5c1d072c1700055c82

| Field Size | Description | Data Type | Values |
|---|---|---|---|
| 4 bytes | Protocol Version | Integer [32] | 0 × 2000e000 |
| 32 bytes | Previous Blocks | Character [32] | |
| 32 bytes | Merkle Root | Character [32] | |
| 4 bytes | Timestamp | Unsigned Integer [32] | 9 Apr. 2019, 21:38:00 |
| 4 bytes | Bits | Unsigned Integer [32] | 172c071d |
| 4 bytes | Nonce | Unsigned Integer [32] | 2,187,068,672 |

For Themys Hashrate Bonds 80, the bits value (four bytes between bytes 72 and 76) is the short form value for difficulty 66. Other blockchains use a similar structure for determining network target difficulty 66 for mining.

Figure 4:
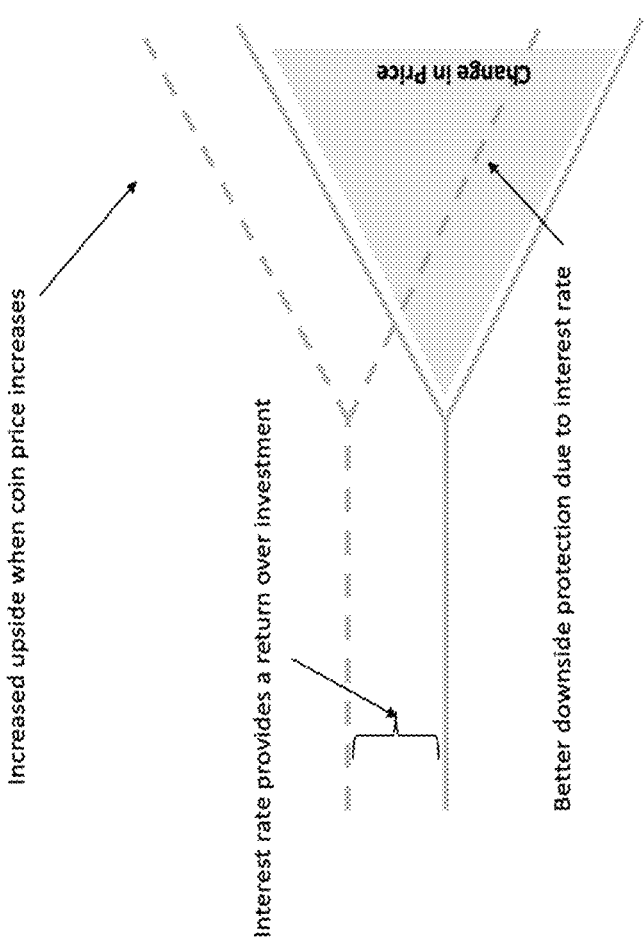
FIG. 4 illustrates bond performance verses holding the cryptocurrency, according to exemplary embodiments.

FIG. 4 illustrates bond performance verses holding the cryptocurrency 50, according to exemplary embodiments. A bond represents a loan made to a company (the issuer) by a group of investors, who are then repaid over time. The principal, also called face value or par value, is the amount of money borrowed to finance the project, and interest accrues on. While the principal may be repaid over a period of time or when the bond fully matures, the interest is paid in regular, specified intervals.

The Themys Hashrate Bond 80 operates upon the same principles, but is unique in allowing the issuer to offer the bond's principal in either U.S. Dollar (USD) denomination or the cryptocurrency 50 of the blockchain 34 to be mined. Additionally, the interest 72 will always be denominated in the cryptocurrency 50 of the mined blockchain 34, partially tying the serviced debt to the income generated. Issuers have the option to repay the principal in either USD or the cryptocurrency 50 being mined, but may not change the selected denomination after the bond is issued. In most cases an issuer will elect to make principal repayment in USD, especially if they believe the price of cryptocurrency 50 will increase over time. For USD principal denominations, repayments will occur on a 180/360-day, semi-annual cycle (discussed in greater detail, below).

If an issuer and investors agree to principal repayment in cryptocurrency denomination, the bond issuance must include provisions for the exchange price, reference index, and repayment schedule. Exchange price can be set on the current market or spot price, to the repayment date prevailing spot price (listed by the reference index), or set some time before the repayment date using a future's contract pricing (again, defined by the reference index). This represents the cryptocurrency/USD exchange rate for the principal repayment.

When dealing with principal denominated in cryptocurrency 50, the repayment schedule should consider the blocktime 64 of the mined protocol. Blocktime 64 is the average amount of time between blocks being found on the protocol, and is influenced by the network difficulty 66, hashrate 62, and additional participant factors. As miner income is generated through finding these blocks, provisions should be put in place to ensure the issuer has sufficient time to generate income for repayment. Repayment schedules and blocktimes 64 are discussed in greater detail later.

The interest for Themys Hashrate Bonds 80 is always denominated in the cryptocurrency 50 being mined. Cryptocurrency denominated interest aligns issuers, the miners of the asset, with investors who are purchasing a secured hashrate 62 for the underlying blockchain protocol. Interest for Themys Hashrate Bonds 80 is a variable rate with an inverse relationship between the secured hashrate 62 and the rate of the network difficulty 66. Once the bond terms have been agreed upon, the secured hashrate 62 provided by the issuing miner remains constant: the interest rate then declines as difficulty increases, and increases as difficulty declines. The proportional relationship is simplified below:

$$f(\text{Interest Rate}) \propto \frac{\text{Secured Hashrate}}{\text{Network Difficulty}} \quad \text{Equation 1}$$

Interest and network difficulty inverse relationship

By defining interest inversely to network difficulty 66, miners receive interest payment relief as the mining process becomes increasingly difficult and less profitable. Simultaneously investors realize greater upside participation, and receive more cryptocurrency 50, when network difficulty 66 declines.

When principal is denominated in the cryptocurrency asset, interest payment is applied directly to the remaining principal. When principal is denominated in USD, as changes in cryptocurrency pricing would also impact interest repayment, the exchange price is determined at the time of issuance through the same reference index used for principal repayment. This fixed-exchange is conducted based on the principle of aligned interest between issuers and investors.

All Themys Hashrate Bonds 80 pay interest in the cryptocurrency 50 being mined and can be considered a derivative of the originating asset. Similarly, the coupon rate and Annual Percentage Yield (APY) are devised by using the same asset's difficulty target, usually found within the block header. The only non-blockchain information required to calculate the coupon rate is the Fixed Rate, Adjustment Rate, and Secured Hashrate (defined below).

Fixed Rate: A minimum rate (expressed as percentage) applied to the APY for a Themys Hashrate Bond 80. The fixed rate is the minimum APY that a Themys Hashrate Bond 80 can have and is only used in the calculation of Stepped Hashrate coupons.

Adjustment Rate: A rate increases (applied in basis points, or BIPS) applied to the APY for a Themys Hashrate Bond 80. This rate is multiplied by the expected number of blocks to be found in a Difficulty Period, and then added to the Fixed Rate. Adjustment Rate is only used for the calculation of Stepped Hashrate coupons.

Secured Hashrate: The sum hashrate of mining hardware financed by the Themys Hashrate Bond 80. This value will differ between bonds based on approved use of funds, specific equipment being financed, and the cryptocurrency 50 being mined. This hashrate value will not change during the lifetime of the bond, and represents the obligated hashrate pledged by the miner. Secured hashrate is used in calculating both Linear and Stepped Hashrate coupons Of note, while the Secured Hashrate is agreed upon in contract, this value can be approximated and validated entirely from on-chain, block header information. By summing the number of signatures associated with the issuer's address and multiplying by the average network difficulty 66, over a period of time (n) defined in blocks:

$$\text{Secured Hashrate} \approx \frac{\sum \text{Signatures}_n \overline{\text{Difficulty}_n}}{\text{Blocks}_n} \quad \text{Equation 2}$$

Approximate secured hashrate

Difficulty adjustments and accommodating Network Hashrate Growth may be considered. Historically, the Bitcoin network has increased network hashrate at a rate of 5.3% per difficulty epoch, leading to an ever-increasing difficulty. Between difficulty epochs the hashrate may also greatly fluctuate, significantly impacting the profitability of mining. To ensure miner profitability and reduce the volatility of the repayment schedule, the Network Difficulty 66 is increased by an adjustment factor.

Adjusted Difficulty=Network Difficulty×Adjustment Factor

To reflect the historic growth of network hashrate 62, an adjustment factor of 7% has been selected. This adjustment factor maintains the target hashrate over total network hashrate for the majority of historic back testing.

Practically, this also allows the miner to record an adjusted luck of 1+Adjustment Factor %. For the selected adjustment factor of 7%, the miner is expected to have a realized luck of 107% for the adjusted target hashrate 62. This provides additional buffer during periods of negative luck and increasing periodic network hashrate 62.

Adjusted Miner Luck      Equation 3

$$\text{Adjusted Luck} \approx \frac{\sum \text{Signatures}_n \times (\text{Target Hashrate} \times \text{Adjustment Factor})}{\text{Blocks}_n \times \text{Miner Hashrate}}$$

This adjustment factor impacts the bond's coupon by slightly reducing the hashrate 62, but increases the likelihood of repayment by reducing the miner's exposure to temporary volatility and repayment ability, Linear Hashrate (LNH) Coupon and APY may be considered. Linear Hashrate (LNH) is an inverse relationship between the cryptocurrency's Target Hashrate and the Secured Hashrate—when the Target Hashrate increases the Linear Hashrate decreases, and vice versa. The Secured Hashrate will not change during the bond's lifetime. Simply put, the LNH Coupon formula can be expressed as:

Linear hashrate coupon      Equation 4

$$LNH \text{ Coupon} = \frac{\text{Secured Hashrate}}{\text{Target Hashrate}}$$

To express the LNH Coupon as an APY, you simply multiply the above by the number of interest payment periods in a calendar year.

Linear hashrate *APY*      Equation 5

$$LNH \ APY \frac{\text{Secured Hashrate}}{\text{Target Hashrate}} \times \text{Payment Periods}$$

$$LNH \ APY \frac{\text{Secured Hashrate}}{\text{Target Hashrate}} \times \text{Payment Periods}$$

For Themys Hashrate Bonds 80, the number of payment periods is calculated by finding the number of difficulty adjustment periods in a single year for a cryptocurrency 50. Bitcoin's blockchain difficulty is adjusted approximately every 2 weeks (2016 blocks), and is expressed as 26 payment periods for a 2-year bond.

ex. Bitcoin Mining Co. issues a $10 million bond with Themys, and elects to use the Linear Hashrate method. 90% of these funds are used to purchase ASIC mining equipment, with a total installed (and secured) hashrate of 300,000 terra-hashes.

The network difficulty of Bitcoin on the first interest payment date is 45,000,000 terra-hashes (45 exa-hashes). The Linear Hashrate coupon is $$\frac{300,000}{45,000,000},$$

approximately 0.667% for this payment period, while the approximate APY is $$\frac{300,000}{45,000,000 \times 26}$$

or 17.33%.

At the end of the bond's interest payment (approximately 2 years later) the network difficulty has increased to 260,000 terra-hashes (260 exa-hashes), matching Bitcoin's historic 7% per month difficulty increase trend. Bitcoin Mining Co. is still obligated to provide a secured hashrate of 300,000 terra-hashes, but the coupon rate is $$\frac{300,000}{260,000,000}$$

approximately 0.115%. This is expressed as 3% APY.

Example: 1 Linear hashrate methodology

While LNH is a straightforward method for devising coupon and APY, it is sensitive to large changes in the network's target hashrate 62. This may make the LNH methodology less attractive to investors and issuers (depending on network state). In addition, the LNH methodology devises coupon first, making APY calculations less accurate than may be desired.

Stepped Hashrate (STH) APY and Coupon may be factors. Themys developed the Stepped Hashrate (STH) to address limitations within LNH, while maintaining a variable interest rate for hashrate bonds. STH accomplishes this by providing a low, adjustable rate based on the expected number of blocks found in a blockchain difficulty adjustment period. The basis of STH is the same as the LNH Coupon, grounding the calculation in the inverse relationship between secured hashrate and target hashrate. This ratio (as a percentage) is multiplied by the number of blocks mined during a difficulty adjustment period—for Bitcoin, this is 2016—and rounded down to a whole number. This result is the number of expected blocks to be found within an adjustment period, and does not include any transaction fees, uncle blocks, or additional blocks/coins found.

Next, the number of expected blocks is multiplied by the adjustment rate. This is the variable interest applied to the bond, and is added to the fixed rate to calculate the APY for the payment period.

$$STH\ APY = \text{Fixed Rate} + \left(\left[\left(\frac{\text{Secured Hashrate}}{\text{Target Hashrate}}\right) \times \text{Blocks in Period}\right] \times \text{Adjustment Rate}\right)$$

Equation 6: Stepped hashrate APY

Calculating the coupon for STH is simply dividing the STH APY by the number of interest payment periods in a calendar year.

Stepped hashrate Coupon  Equation 7

$$STH\ Coupon = \frac{\text{Fixed Rate} + \left(\left[\left(\frac{\text{Secured Hashrate}}{\text{Target Hashrate}}\right) \times \text{Blocks in Period}\right] \times \text{Adjustment Rate}\right)}{\text{Annual Payment Periods}}$$

ex. Bitcoin Mining Co. issues a $10 million bond with Themys, and elects to use the Stepped Hashrate method. 90% of these funds are used to purchase ASIC mining equipment, with a total installed (and secured) hashrate of 300,000 terra-hashes. The network difficulty of Bitcoin on the first interest payment date is 45,000,000 terra-hashes (45 exa-hashes).

The ratio between secured hashrate and network hashrate is $$\frac{300,000}{45,000,000},$$

meaning Bitcoin Mining Co. can expect to find approximately 0.667% of Bitcoin blocks during the difficulty adjustment period. Bitcoin adjusts difficulty every 2016 blocks: therefore, Bitcoin Mining Co can expect to find 13 blocks (0.667%×2016=13.44, but partial blocks cannot be found and is rounded down to 13).

The expected number of blocks is multiplied by the adjustment rate, set at 10 bps, resulting in a variable rate of 1.3%. This is added to the fixed rate of 7%, netting a STH APY of 8.3%. The APY is divided by the number of payment periods in a calendar year (26 for Bitcoin bonds) to get a STH Coupon of 0.319% for this payment period.

At the end of the bond's interest payment (approximately 2 years later) the network difficulty has increased to 260,000 terra-hashes (260 exa-hashes), matching Bitcoin's historic 7% per month difficulty increase trend. Bitcoin Mining Co. is still obligated to provide a secured hashrate of 300,000 terra-hashes, but now only finds 0.115%

$$\left(\frac{300,000}{260,000,000}\right)$$

of blocks during a 2-week difficulty adjustment period. This equates to 2.33 blocks found per period, though only the 2 whole blocks are used for STH calculations. Multiplying 2 by the 10 bps adjustment rate results in a variable rate of 0.2%, or a final STH APY of 7.2% when including the fixed rate. For this final payment, the coupon rate is 0.277%.

Example: 2 Stepped hashrate methodology

Issuance, Dated Date, Settlement and Maturity are now explained. Themys Hashrate Bonds 80 rely upon two separate measures of time for payments of principal and interest. Depending on the denomination and asset being mined, principal and interest payments will be made at different intervals and handled in different ways. Themys Hashrate Bonds 80 therefore use two different timing methods; Chronological Time, utilizing a standard bank year (360 days); and Block Time, relating to a blockchain protocols expected block discovery rate and corresponding block height.

Figure 5:
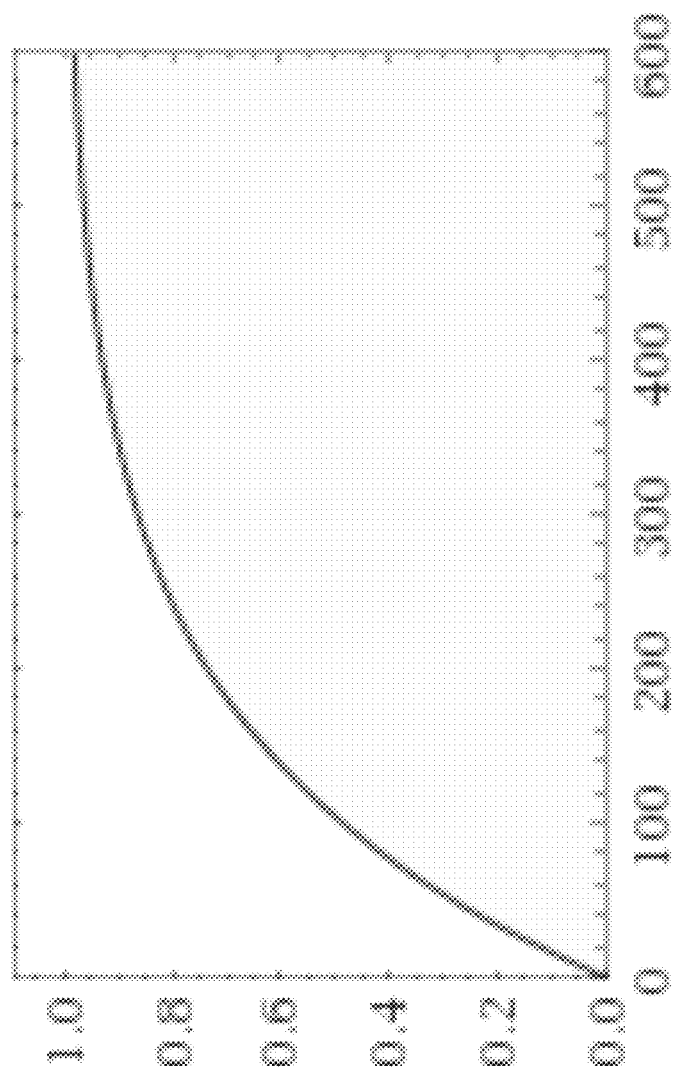
FIG. 5 is a probability graph, according to exemplary embodiments.

FIG. 5 is a probability graph, according to exemplary embodiments. Here the probability of finding a block is graphed according to time (seconds). As discussed above, blockchain difficulty rises and falls in proportion to the overall network difficulty 66 and a targeted time period. For Bitcoin blocks are expected to be found once every 10 minutes, and the difficulty is retargeted to this time period once every 2016 blocks—approximately 2 weeks. However, while difficulty retargeting is based on the prevailing network hashrate 62, the overall network hashrate 62 fluctuates a great deal during any extended period. This results in slightly delayed (or faster) blocks, and the difficulty adjustment period not being exactly 2 weeks.

From FIG. 5, it can be seen that although the probability of finding a block within 10 minutes (600 seconds) approaches certainty, there is a low probability of finding a block sooner or later. This is because Bitcoin mining does not have cumulative progress, and is instead like a lottery with odds of $$\frac{1}{\text{Difficulty} \times 2^{32}}.$$

The formula to determine the probability of finding a block before a certain time is therefore a density function: What is the probability that a block solution will be found reasonably close to the target blocktime (in seconds)? Below is a probability density function for Bitcoin blocks with a reasonable estimate of ±x seconds:

Block time probability density function $\qquad$ Equation 8

$$P(t_{target-x} \leq t_{block} \leq t_{target+x}) = 1 - e^{-\frac{t}{2^{32} \, Difficulty}}$$

$$P(t_{target-x} \leq t_{block} \leq t_{target+x}) = 1 - e^{-\frac{t}{2^{32} \, Difficulty}}$$

While reasonable is a subjective matter, the Themys Hashrate Bond 80 has aims to meet the 28-day CFTC guideline on physical deliver for payments made in cryptocurrency 50. Using the above formula (and generously bad luck), the average distribution for blocks during an interest payment period would need to exceed 200%, for 2016 blocks in a row. Simple probabilistic mathematics reveal that this is infinitesimally unlikely.

As the Themys Hashrate Bond 80 is the digital derivative 20, the schedule of interest and principal payments can be defined in blocktime 64 rather than chronological time using the calculations above. While this will impose some small accounting date differences for a bond, these may be mitigated by using a projected hashrate model (discussed later). In addition, the possibility of automated repayment directly on-chain provides instant settlement, as opposed to standard 2 business day, further minimizing disruption.

The Themys Hashrate Bond 80 may consider Interest Settlement Dates. The interest repayment schedule, being solely tied to the actual cryptocurrency mining, is determined by difficulty readjustment and block time. This makes the repayment schedule based on block time and not chronological time, but can be reasonably estimated and remain within physical delivery windows, as discussed above. As difficulty readjustments will adjust the interest rate of the bond, repayment schedules should occur reasonably often.

Interest repayment schedule using blocktime $\qquad$ Equation 9

$$\frac{Blocks_{Period}}{Blocks_{Annual}} \approx \frac{Blocktime_{min} \times Blocks_{Period}}{360 \text{ days}}$$

$$\frac{Blocks_{Period}}{Blocks_{Annual}} \approx \frac{Blocktime_{min} \times Blocks_{Period}}{360 \text{ days}}$$

Bitcoin adjusts difficulty every 2016 blocks, approximately 2-weeks, and provides a base-line block and chronological time for payment reschedule. Using the above approximation, a Themys Hashrate Bond 80 securing the Bitcoin blockchain, the scheduled interest repayment would occur as follows:

Bitcoin interest repayment schedule $\qquad$ Equation 10

$$\frac{2016 \text{ blocks}}{52416 \text{ blocks}} \approx \frac{14 \text{ days}}{360 \text{ days}}$$

$$\frac{2016 \text{ blocks}}{52416 \text{ blocks}} \approx \frac{14 \text{ days}}{360 \text{ days}}$$

The above calculations assume that blocks during the period all share the same network difficulty 66; while this is the case for Bitcoin, other protocols may readjust difficulty at a rate too rapid to support interest repayments. By using an average difficulty for a time period, a generalized equation can be formed for protocols with shorter readjustment periods Depending on whether USD or the mined cryptocurrency 50 was elected for the principal repayment, principal settlement dates will either be based on a chronological calendar year or blocktime, similar as above. When based in USD, the principal settlement dates will be stipulated in the bond agreement on a 180/360 financial calendar, with payments and settlement following the prevailing market. If principal payments are elected in cryptocurrency 50, the investor and issuer agree to a repayment schedule based on blocktime in one of two schedules; semi-annual repayments, or epoch adjustment repayments. For semi-annual payments, the payment should be made every nth block, where n is equal to:

Semi-Annual principal repayment schedule using blocktime $\qquad$ Equation 11

$$Blocks_{Princiapl\,Payment} = \frac{Blocks_{Annual}}{2}$$

$$Blocks_{Princiapl\,Payment} = \frac{Blocks_{Annual}}{2}$$

For Bitcoin, the repayment schedule approximately works out as below:

Bitcoin principal repayment schedule $\qquad$ Equation 12

$$\frac{13 \text{ epochs} * 2016 \text{ blocks}}{52416 \text{ blocks}} \approx \frac{180 \text{ days}}{360 \text{ days}}$$

$$\frac{13 \text{ epochs} * 2016 \text{ blocks}}{52416 \text{ blocks}} \approx \frac{180 \text{ days}}{360 \text{ days}}$$

It is possible, as with interest repayment, to elect a repayment schedule where some amount of principal is repaid every epoch adjustment. In this case, principal repayments would occur on the same schedule as interest payments and can be calculated using Equation 10: Interest repayment schedule using blocktime. It should be noted that the total interest paid is less when epoch adjustment repayments are selected because there are more payments made during a calendar year. For investors, this reduced interest is made up in the higher frequency of payments made, with faster settlement using the blockchain protocol being mined.

Figure 6:
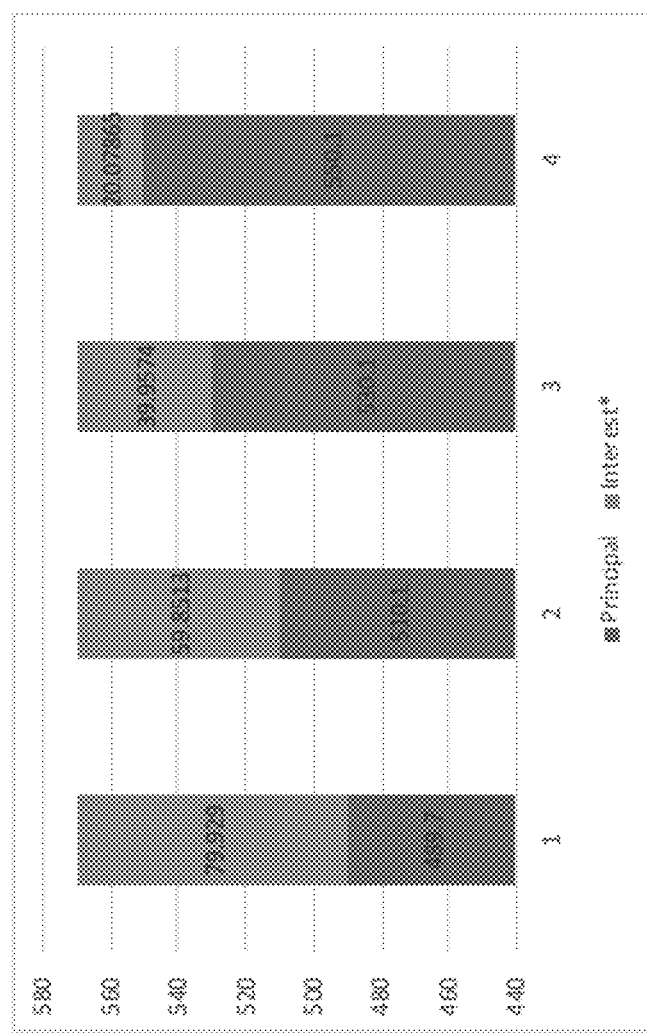
FIGS. 6-7 illustrate maturation of a Themys Hashrate Bond, according to exemplary embodiments.
Figure 7:
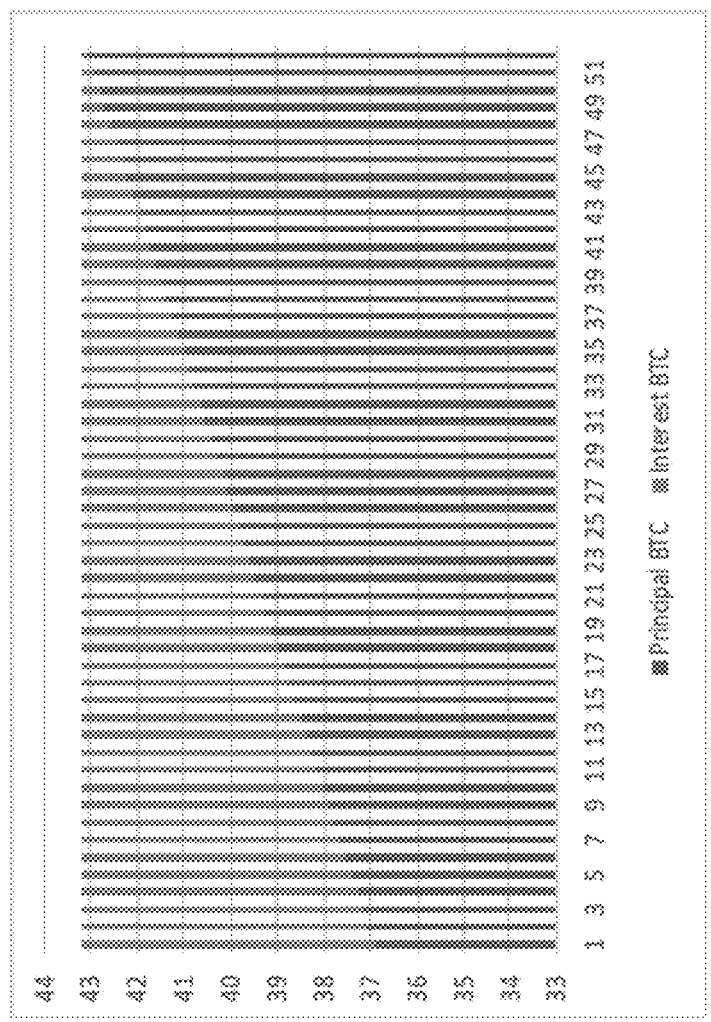

FIGS. 6-7 illustrate maturation of the Themys Hashrate Bond 80, according to exemplary embodiments. FIG. 6 illustrates a Semi-Annual Bond Maturity Schedule, while FIG. 7 illustrates an Epoch Adjustment Bond Maturity Schedule. Because Themys Hashrate Bonds 80 are used to secure hashrate 62 for a blockchain protocol by purchasing new mining equipment, bond terms are typically shorter than 3 years. Based on the release cycle of new hardware and models of increasing hashrate 62, a 2-year bond is considered the base for most bonds. For Bitcoin, a 2-year bond equates to 52 scheduled payments, with the final payment repaying any remaining interest and principal. The maturity (and payment schedules) for Themys Hashrate Bonds 80 have been modeled after traditional municipal bonds. This decision was made to best allow both issuers and investors to predict their payment flows for the lifetime of the bond.

Additionally, since miners provide a public utility in the form of transaction relay and validation, a municipal style bond was selected in the hope of eventually receiving local, state, and federal level support.

Depending on which principal payment schedule was elected, the repayment schedule will consist of 4 level-debt payment periods (with multiple interest payments and 1 principal payment) or several payments consisting of principal and interest corresponding to the epoch adjustment periods. Below are 2 level-debt repayment charts for Bitcoin; the first for semi-annual principal repayment, the second for epoch adjustment. In both maturity schedules, the payment schedule in total is a level-debt structure of less than 0.1 BTC.

Figure 8:
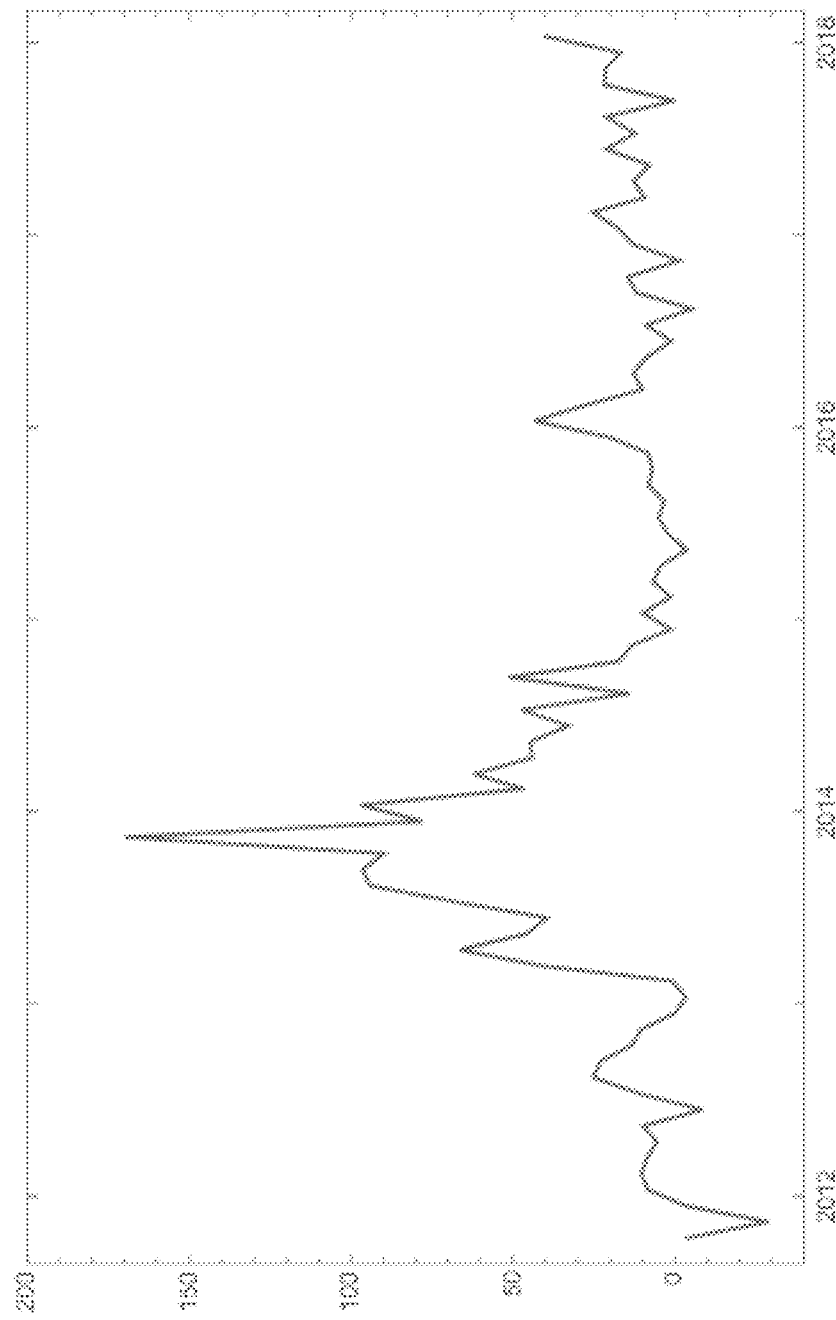
Figure 9A:
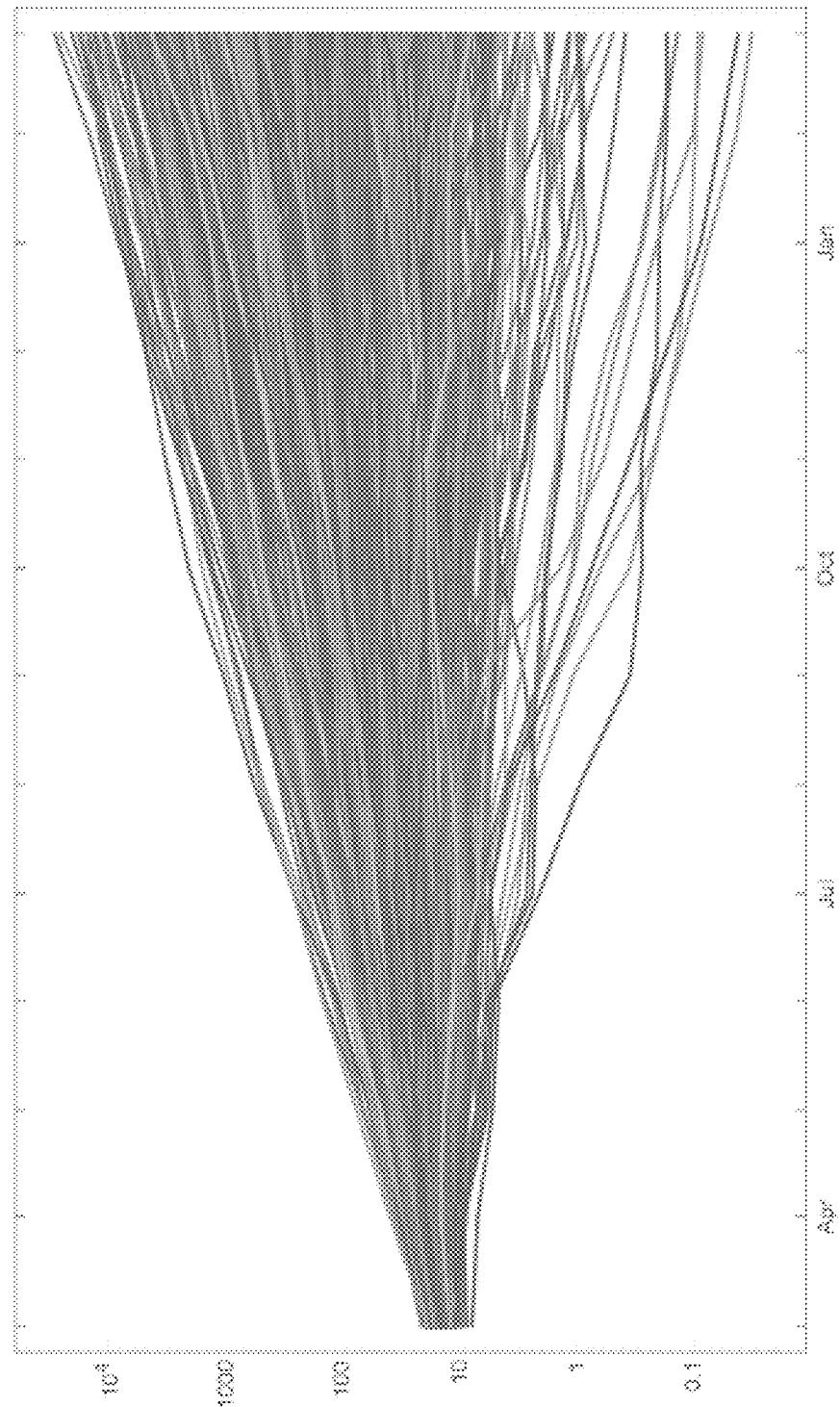

FIGS. 8-9A, 9B, 9C, AND 9D further illustrate the difficulty 66, according to exemplary embodiments. FIG. 8 illustrates a monthly percentage change in the difficulty 66, while FIG. 9A illustrates simulations of network speed in ExaHash/second for the next 12 months using above process. The best fit model to historical data of monthly multiplicative difficulty changes is an autoregressive process:

$$\frac{\text{Difficulty}_t}{\text{Difficulty}_{t-1}} = 0.2 + 0.49 \times \frac{\text{Difficulty}_{t-1}}{\text{Difficulty}_{t-2}} + 0.35 \times \frac{\text{Difficulty}_{t-2}}{\text{Difficulty}_{t-3}} + \epsilon_t$$

the parameters have strong t-statistics of 4.5 and 3.2 and the error variance is low 0.03. Above observations allow us to assume change of difficulty 66 continues the trend of the previous months. A simple model using a daily constant difficulty increase rate r should be sufficient for practical purposes over short time periods. We define expected difficulty for a future in t days as $$\text{Difficulty}_t = \text{Difficultly}_{current} \times (1+r)^t.$$

Previous simulation gives us an estimate r=0.75% which corresponds to an annualized difficulty increase of 1429%.

The difficulty epoch (sometimes called block epoch) refers to the number of blocks found before a difficulty adjustment on the network. In almost all cases, these blocks will share the same difficulty and target hashrate. By multiplying the difficulty epoch by the blocktime, an estimate of the time between difficulty adjustments can be made.

$$T = \text{Blocks}_{Epoch} \times \text{Blocktime}_{minutes}$$

There is a relationship between the network difficulty 66 and the blocktime 64. As more miners join a protocol, the overall network hashrate 62 increases; and with more hashes, the mining solution is found faster. To maintain the desired blocktime 64, the network increases and lowers the network difficulty 66 as network mining participation increases and decreases, respectively. FIG. 9A thus shows that the hashrate 62 of the network may be reasonably predicted based on the autoregressive model.

Mining rewards refers to the incentives paid to miners for the successful creation of a new block for the network. This reward consists of the coinbase of newly minted coins, as well as any fees generated by transactions included in the block.

Mining Luck may also be present. Since all SHA256 hashes are effectively a random number between 0 and $2^{256-1}$, each completed hash is as likely to meet the target solution and discover a valid block. This means that occasionally a miner or pool will get "lucky", and find more blocks than their network share of hashrate would otherwise imply. Luck is expressed as a percentage ratio of actual found blocks over the expected number of blocs over a period of time, typically one day.

$$\text{Luck} = \frac{\sum \text{Signatures}_n \times \text{Target Hashrate}}{\text{Blocks}_n \times \text{Miner Hashrate}}$$

By using the sum of signed blocks over a period of time, mining luck can be calculated independently of the miner or pool by any network participant. If a miner has good or bad luck, the long-term average should be close to 100% (no positive or negative luck effect).

The Network Share may be defined. The overall percentage of hashes contributed to a network protocol over a period of time. This can be easily substituted as:

$$\frac{\text{Miner Hashrate}}{\text{Target Hashrate}},$$

but it is preferential to use protocol specific formulae to reduce the number of secondary calculations for information not stored in the block header.

Figure 9B:
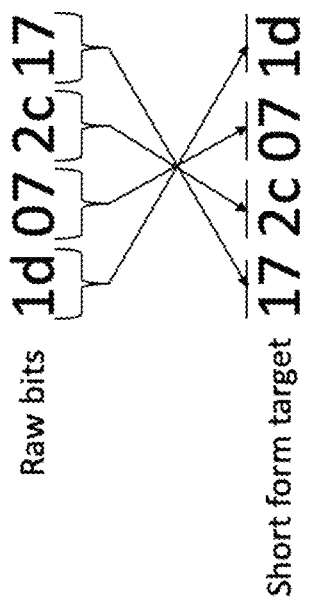

As FIG. 9B illustrates, there may be Bitcoin Specific Equations. For example, there may be conversions between bits, the network difficulty 66, the target hashrate 62. FIG. 9B, for example, illustrates a conversion of bits to short form target (Converting between) Bits, Bitcoin.

The mining difficulty 66 is recorded in the blockchain 34 in every block 42 of data, therefore it is its authoritative source. The encoding is rather specific to each blockchain 34; for example, for BITCOIN®, the mining network difficulty 66 may be reverse engineered from a blockheader source as: interpret the 73rd byte of the block as a positive number x and 74-75th bytes as a big-endian positive number y. The block chain encoded difficulty is then:

$$\text{Difficulty} = (2^{16} - 1)\frac{2^{208-8(x-3)}}{y}$$

$$\text{Difficulty} = (2^{16} - 1)\frac{2^{208-8(x-3)}}{y}$$

Bitcoin difficulty epochs are 2016 blocks, and with a blocktime of 10 minutes the desired difficulty epoch is 2 weeks (20,160 minutes).

$$\text{Target Hashrate(difficulty)} = \frac{2^{32}}{600} \text{difficulty} \approx 7158278 \times \text{difficulty}$$

For Bitcoin specifically, the percentage market share of a miner's hashrate can be calculated as follows:

$$\text{Network Share} = \frac{\text{Miner Hashrate} \times 600}{\text{Difficulty} \times 2^{32}} \approx \frac{\text{Miner Hashrate}}{7158278 \times \text{Difficulty}}$$

The bitcoin mining reward is halved every 210,000 blocks (approximately every 4 years), and limits the total supply of Bitcoins ever produced to just under 21,000,000 coins.

$$\text{Mining Reward}_{Height} = 50 \times 2^{-\lfloor \frac{Height}{210000} \rfloor} + \text{Fees}$$

With this model, Bitcoin will eventually produce no block reward after approximately 136 years of operation—in the year 2145. Transaction fees will then be the sole mining reward. The Themys Hashrate Bond is currently modeled for coinbase block rewards>1 BTC and does not consider transaction fees, though similar models can be utilized for a fee-only bond.

One may estimate production of Bitcoin. A miner with known hash speed s, that is a subset of the networks total, will have a proportionally longer expected time to solution than the network. Consequently the share of the network's daily total reward will be proportional to market share as follows:

$$fN(h)24 \times 6 \approx 2.01166 \times 10^{-5} \frac{s}{d} N(h)$$

A 10 TH/s ($10^{13}$ hash/s) miner at block height 57595 (H(57595)=12.5) and current difficulty of 1590896927258, is expected produce at least 0.0015806 Bitcoins or 15860 bits today.

Figure 9C:
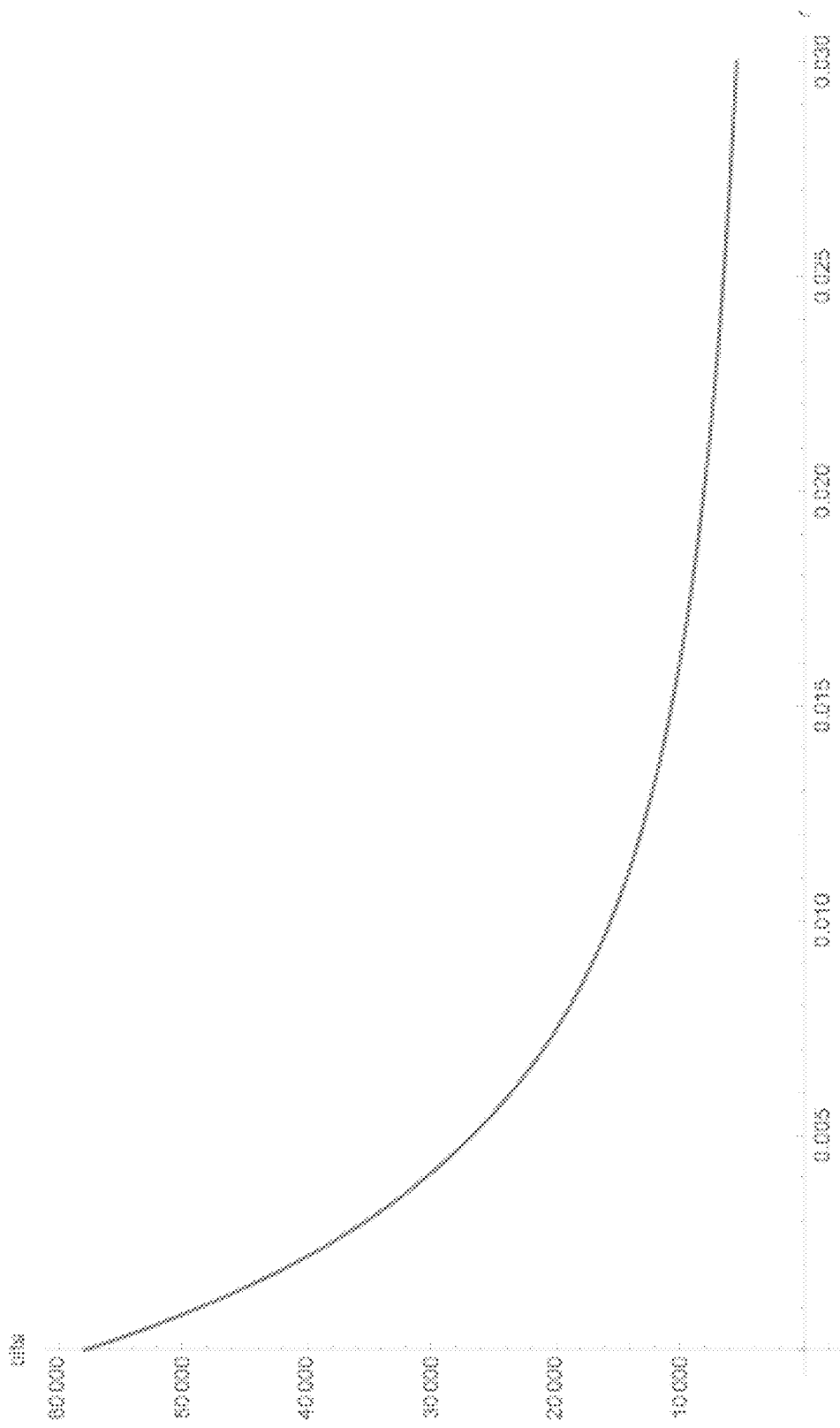

As FIG. 9C illustrates, an expected Bitcoin income may be estimated. The expected number of Bitcoins a mining machine can produce within t days is determined by the current block reward and the difficulty rate increase. If we assume that there is no reward halving in the relevant lifetime, then N(h)=N, and the expected income is:

$$2.01166 \times 10^{-5} N \frac{s}{d} \sum_{0}^{t} (1+r)^{-i} = 2.01166 \times 10^{-5} N \frac{s}{d} \left( \frac{1 + r - (1+r)^{-t}}{r} \right)$$

Figure 9D:
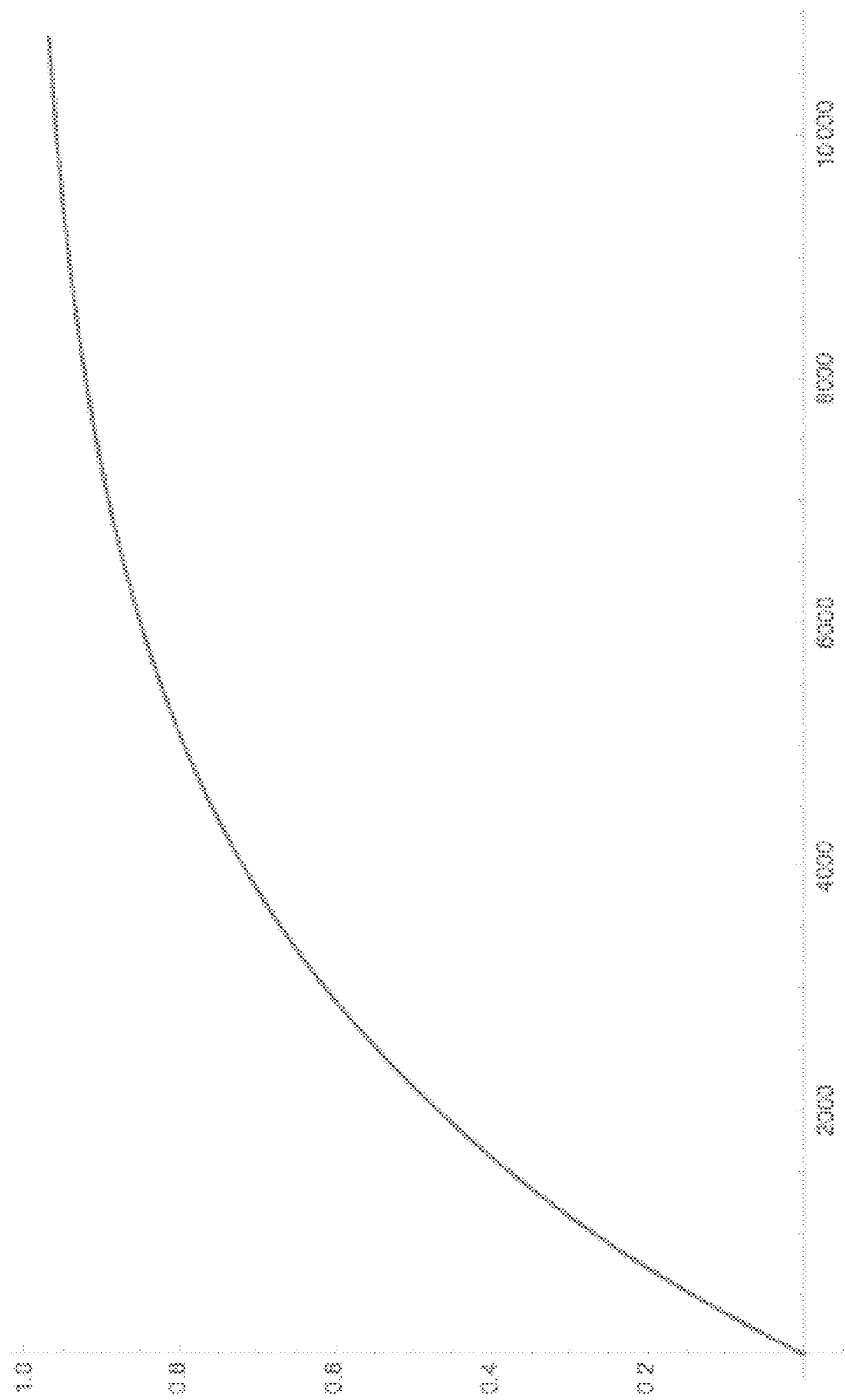

As FIG. 9D illustrates, the time to find a block of data in the Bitcoin blockchain may be estimated. Performing hashes has no "progress", means no matter how many calculations were performed earlier, the probability that the next hash calculated is the winner remains unchanged at $1/(d*2^{32})$. The time to next block for a hash speed s has therefore an exponential distribution with below cumulative density function (t is measured in seconds):

$$P(t_{target-x} \le t_{block} \le t_{target+x}) = 1 - e^{-\frac{t}{2^{32} \text{Difficulty}}}$$

$$P(t_{target-x} \le t_{block} \le t_{target+x}) = 1 - e^{-\frac{t}{2^{32} \text{Difficulty}}}$$

FIG. 9D illustrates a probability that a mining pool with 2.162 EH speed at difficulty of 1590896927258 finds a block in number of seconds.

Some bond terms and definitions may be helpful. The Issue size of a bond offering is the number of bonds issued multiplied by the face value. For example, if an entity issues two million bonds with a $100 face price, the issue size is $200 million dollars. The issue size reflects both the borrowing needs of the entity issuing the bonds, as well as the market's demand for the bond at a yield that's acceptable to the issuer. The issue date is simply the date on which a bond is issued and begins to accrue interest. The maturity date is the date on which an investor can expect to have the principal repaid. It is possible to buy and sell a bond in the open market prior to its maturity date. The Maturity Value is the amount of money the issuer will pay the holder of a bond at the maturity date. This can also be referred to as "par value" or "face value." Since bonds trade on the open market from their date of issuance until their maturity, their market value will typically be different than their maturity value. However, barring a default, investors can expect to receive the maturity value at the specified maturity date, even if the market value of the bond fluctuates during the course of its life. The coupon rate is the periodic interest payment that the issuer makes on a bond. As bonds trade on the open market, the actual yield an investor receives if they purchase a bond after its issue date (the "yield to maturity") is different than the coupon rate.

Now examples of payment schedules are provided, according to parameters within the blockchain environment 22. For example, the below table illustrates a payment schedule according to block height.

TABLE 3

Summary of semi-annual bond schedule

| Sched. Pmt | Blockheight | Approximate Date | Actual Date | Print Pmt | Int Pmt |
|---|---|---|---|---|---|
| 0 | 449568 | Jan. 22, 2017 | Jan. 22, 2017 | Issuance | Date |
| 1 | 451584 | Feb. 5, 2017 | Feb. 4, 2017 | | 6.00 |
| 2 | 453600 | Feb. 19, 2017 | Feb. 18, 2017 | | 6.00 |
| 3 | 455616 | Mar. 5, 2017 | Mar. 3, 2017 | | 6.00 |
| 4 | 457632 | Mar. 19, 2017 | Mar. 17, 2017 | | 6.00 |
| 5 | 459648 | Apr. 2, 2017 | Mar. 30, 2017 | | 6.00 |
| 6 | 461664 | Apr. 16, 2017 | Apr. 13, 2017 | | 6.00 |
| 7 | 463680 | Apr. 30, 2017 | Apr. 27, 2017 | | 6.00 |
| 8 | 465696 | May 14, 2017 | May 10, 2017 | | 6.00 |
| 9 | 467712 | May 28, 2017 | May 23, 2017 | | 6.00 |
| 10 | 469728 | Jun. 11, 2017 | Jun. 4, 2017 | | 6.00 |
| 11 | 471744 | Jun. 25, 2017 | Jun. 17, 2017 | | 6.00 |
| 12 | 473760 | Jul. 9, 2017 | Jul. 2, 2017 | | 6.00 |
| 13 | 475776 | Jul. 23, 2017 | Jul. 14, 2017 | 489.4 | 6.00 |
| 14 | 477792 | Aug. 6, 2017 | Jul. 27, 2017 | | 4.44 |
| 15 | 479808 | Aug. 20, 2017 | Aug. 9, 2017 | | 4.44 |
| ... | | | | | |
| 49 | 548352 | Dec. 9, 2018 | Nov. 1, 2018 | | 1.50 |
| 50 | 550368 | Dec. 23, 2018 | Nov. 16, 2018 | | 1.50 |
| 51 | 552384 | Jan. 6, 2019 | Dec. 3, 2018 | | 1.50 |
| 52 | 554400 | Jan. 20, 2019 | Dec. 18, 2018 | 549.7 | 1.50 |

TABLE 4

Summary of epoch adjustment bond schedule

| Sched. Pmt | Blockheight | Approximate Date | Actual Date | Print Pmt | Int Pmt |
|---|---|---|---|---|---|
| 1 | 449568 | Jan. 22, 2017 | Jan. 22, 2017 | Issuance | Date |
| 2 | 451584 | Feb. 5, 2017 | Feb. 4, 2017 | 36.9 | 6.3 |
| 3 | 453600 | Feb. 19, 2017 | Feb. 18, 2017 | 37.0 | 6.1 |
| 4 | 455616 | Mar. 5, 2017 | Mar. 3, 2017 | 37.2 | 6.0 |
| 5 | 457632 | Mar. 19, 2017 | Mar. 17, 2017 | 37.3 | 5.9 |
| 6 | 459648 | Apr. 2, 2017 | Mar. 30, 2017 | 37.4 | 5.8 |
| 7 | 461664 | Apr. 16, 2017 | Apr. 13, 2017 | 37.5 | 5.6 |
| 8 | 463680 | Apr. 30, 2017 | Apr. 27, 2017 | 37.7 | 5.5 |
| 9 | 465696 | May 14, 2017 | May 10, 2017 | 37.8 | 5.4 |
| 10 | 467712 | May 28, 2017 | May 23, 2017 | 37.9 | 5.3 |
| 11 | 469728 | Jun. 11, 2017 | Jun. 4, 2017 | 38.0 | 5.1 |
| 12 | 471744 | Jun. 25, 2017 | Jun. 17, 2017 | 38.1 | 5.0 |
| 13 | 473760 | Jul. 9, 2017 | Jul. 2, 2017 | 38.3 | 4.9 |
| 14 | 475776 | Jul. 23, 2017 | Jul. 14, 2017 | 38.4 | 4.8 |
| 15 | 477792 | Aug. 6, 2017 | Jul. 27, 2017 | 38.5 | 4.7 |

TABLE 4-continued

Summary of epoch adjustment bond schedule

| Sched. Pmt | Blockheight | Approximate Date | Actual Date | Print Pmt | Int Pmt |
|---|---|---|---|---|---|
| 16 | 479808 | Aug. 20, 2017 | Aug. 9, 2017 | 38.6 | 4.5 |
| ... | | | | | |
| 50 | 548352 | Dec. 9, 2018 | Nov. 1, 2018 | 42.7 | 0.5 |
| 51 | 550368 | Dec. 23, 2018 | Nov. 16, 2018 | 42.8 | 0.4 |
| 52 | 552384 | Jan. 6, 2019 | Dec. 3, 2018 | 42.9 | 0.2 |
| 53 | 554400 | Jan. 20, 2019 | Dec. 18, 2018 | 43.1 | 0.1 |

The digital derivative 20 may be associated with any cryptographic currency. This disclosure mostly explains BITCOIN®, which most readers are thought familiar. However, the digital derivative 20 may be used with ETHEREUM®, RIPPLE®, or any other cryptographic coin mechanism. Moreover, the digital derivative 20 may be adapted to any compensation or services agreement or scheme.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, graphics processor unit, or state machine. When any of the processors execute instructions to perform "operations," this could include the processor performing the operations directly and/or facilitating, directing, or cooperating with another device or component to perform the operations.

Exemplary embodiments may packetize. When the server 24 and the data source 26 communicate via the communications network 28, the server 24 and the data source 26 may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

The server 24 may include a query mechanism. When the server 24 generates and/or updates the digital derivative 20, the server 24 access and update an electronic database. The electronic database has database entries that map, relate, or associate the digital derivative 20 to its instantaneous hashrate 62, blocktime 64, difficulty 66, principal 70, interest 72, and/or payment 74. The server 24 may thus log any parameters associated with the digital derivative 20. Moreover, the server 24 may query the electronic database for the digital derivative 20 (such as a unique identifier) and identify and/or retrieve any corresponding database entries. The electronic database may thus be represented as a table that maps, converts, or translates the instantaneous hashrate 62, blocktime 64, difficulty 66, principal 70, interest 72, and/or payment 74 to its corresponding block 42 of data in the blockchain 34. Over time, then, the electronic database tracks a comprehensive historical repository of the hashrate 62, blocktime 64, difficulty 66, principal 70, interest 72, and/or payment 74.

Figure 10:
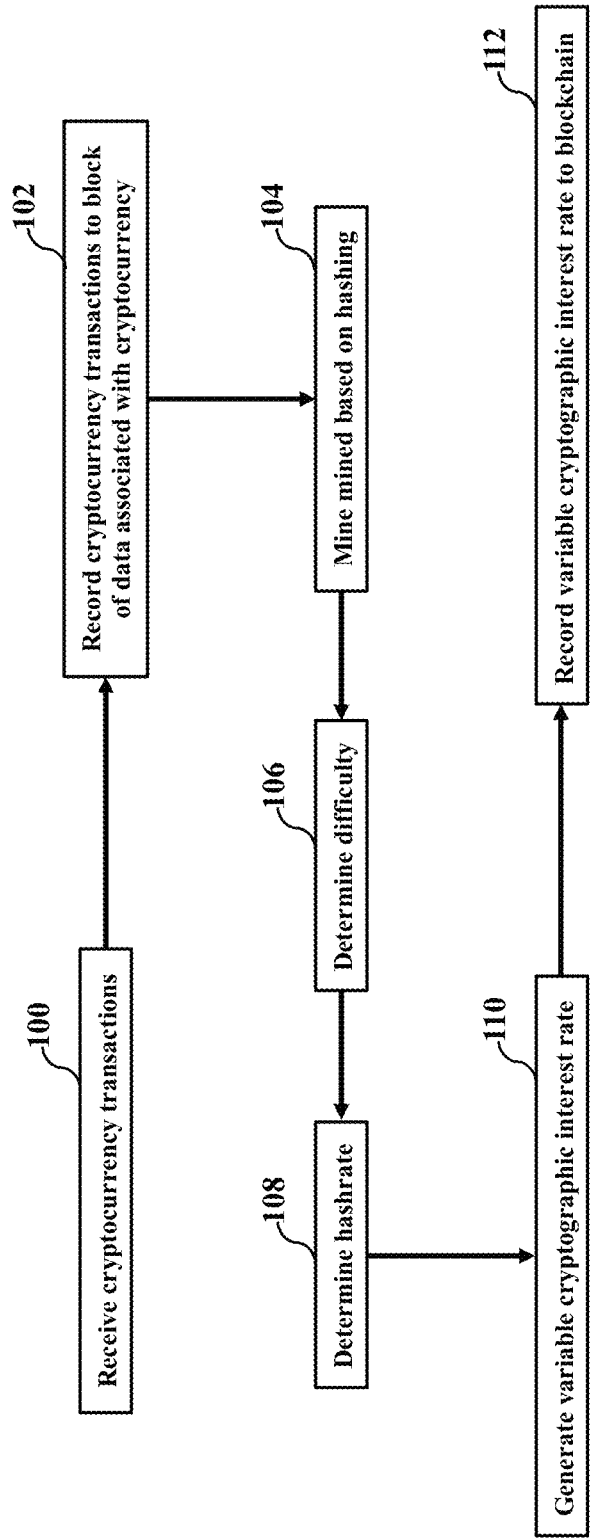
FIG. 10 is a flowchart illustrating a method or algorithm for configuring the digital derivative 20, according to exemplary embodiments.

FIG. 10 is a flowchart illustrating a method or algorithm for generating and/or configuring the digital derivative 20, according to exemplary embodiments. The electronic cryptocurrency transactions 32 are received (Block 100) and recorded to the block 42 of data associated with the cryptocurrency 50 (Block 102). The cryptocurrency transactions 32 are mined based on hashing (Block 104). The difficulty 66 (Block 106) and the hashrate 62 (Block 108) are determined. The variable cryptographic interest rate 72 is generated for the digital derivative 20 based on the difficulty 66 and the hashrate 62 (Block 110). The variable cryptographic interest rate 72 is recorded (Block 112) to the blockchain 34 associated with the cryptocurrency 50.

Figure 11:
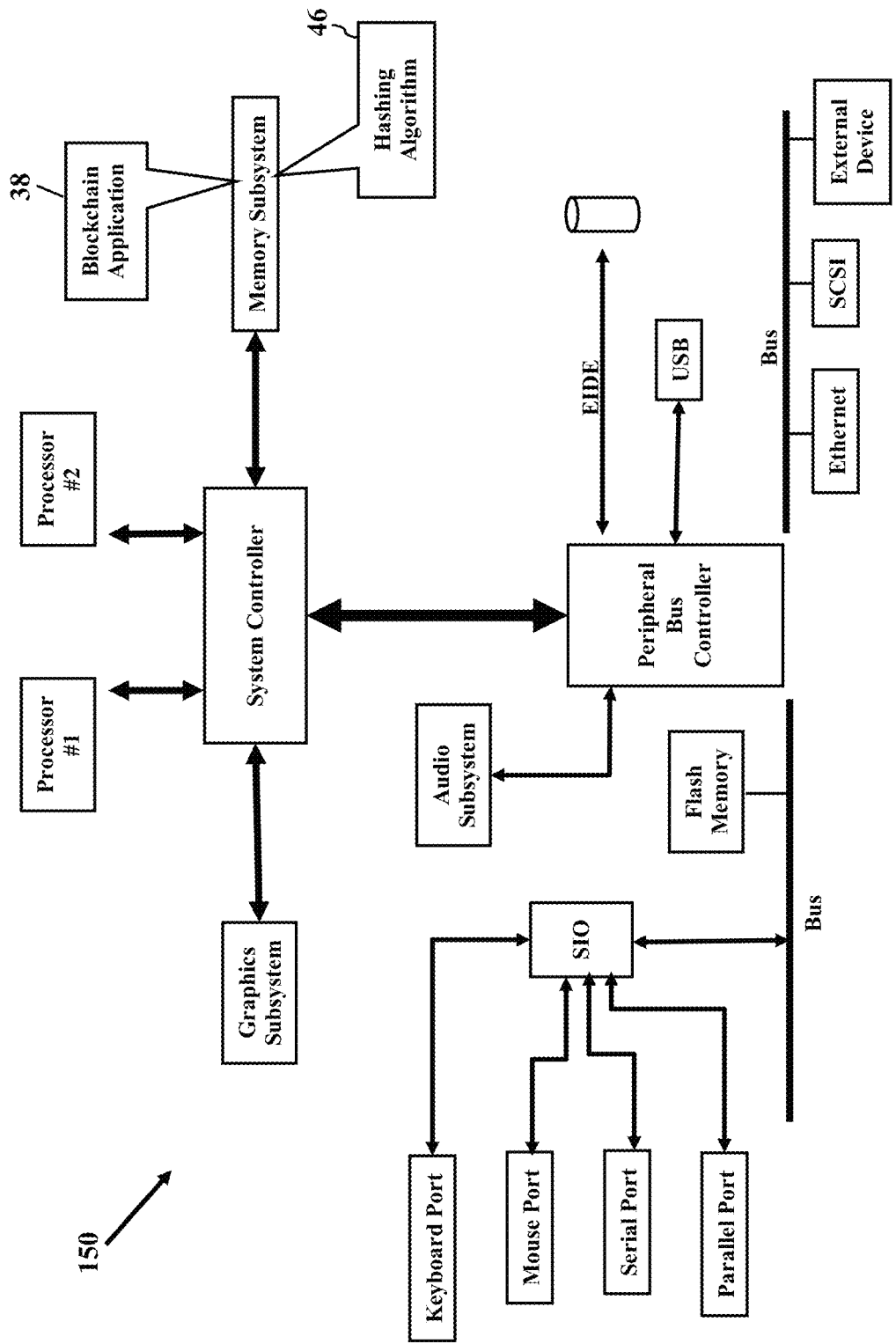
FIGS. 11-12 are illustrates of additional operating environments, according to exemplary embodiments.

FIG. 11 is a schematic illustrating still more exemplary embodiments. FIG. 11 is a more detailed diagram illustrating a processor-controlled device 150 (such as the server 24 illustrated in FIG. 1). As earlier paragraphs explained, the blockchain application 38 and/or the hashing algorithm 46 may partially or entirely operate in any mobile or stationary processor-controlled device. FIG. 11, then, illustrates the blockchain application 38 and/or the hashing algorithm 46 stored in a memory subsystem of the processor-controlled device 150. One or more processors communicate with the memory subsystem and execute either, some, or all applications. Because the processor-controlled device 150 is well known to those of ordinary skill in the art, no further explanation is needed.

Figure 12:
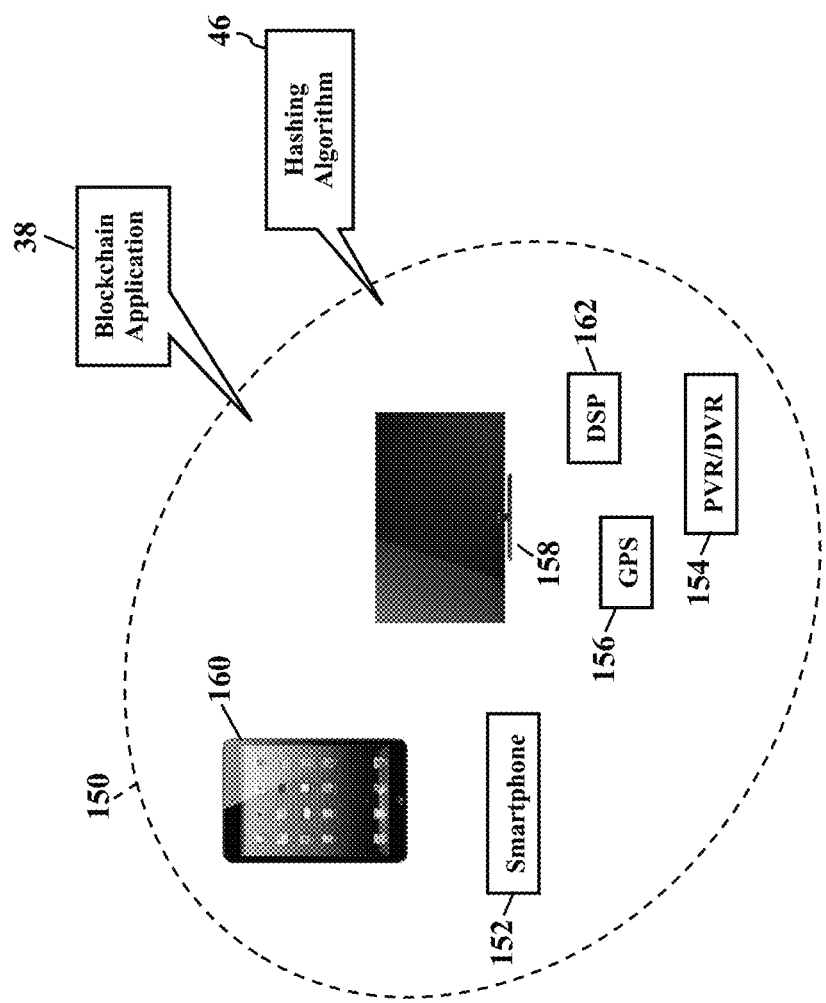

FIG. 12 depicts other possible operating environments for additional aspects of the exemplary embodiments. FIG. 12 illustrates the blockchain application 38 and/or the hashing algorithm 46 operating within various other processor-controlled devices 150. FIG. 12, for example, illustrates that the blockchain application 38 and/or the hashing algorithm 46 may entirely or partially operate within a smartphone 152, a personal/digital video recorder (PVR/DVR) 154, a Global Positioning System (GPS) device 156, an interactive television 158, a tablet computer 160, or any computer system, communications device, or processor-controlled device utilizing any of the processors above described and/or a digital signal processor (DP/DSP) 162. Moreover, the processor-controlled device 150 may also include wearable devices (such as watches), radios, vehicle electronics, clocks, printers, gateways, mobile/implantable medical devices, and other apparatuses and systems. Because the architecture and operating principles of the various devices 150 are well known, the hardware and software componentry of the various devices 150 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for generating and/or configuring the digital derivative 20, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
    recording, by a server, electronic cryptocurrency transactions to blocks of data associated with a cryptocurrency;
    generating, by the server, hash values by hashing the blocks of data using a hashing algorithm;
    determining, by the server, a difficulty associated with the hashing of the blocks of data;
    determining, by the server, a hashrate associated with the hashing of the blocks of data;
    generating, by the server, a variable cryptographic interest rate for a digital derivative based on the difficulty and the hashrate associated with the hashing of the blocks of data; and
    recording, by the server, the variable cryptographic interest rate to a blockchain associated with the cryptocurrency.

2. The method of claim 1, further comprising recording a payment associated with the digital derivative to the blockchain associated with the cryptocurrency.

3. The method of claim 1, further comprising recording a schedule of payments associated with the digital derivative to the blockchain associated with the cryptocurrency.

4. The method of claim 1, further comprising increasing the variable cryptographic interest rate in response to a decreasing value of the hashrate associated with the hashing of the blocks of data.

5. The method of claim 1, further comprising decreasing the variable cryptographic interest rate in response to an increasing value of the hashrate associated with the hashing of the blocks of data.

6. The method of claim 1, further comprising reading the difficulty from a blockheader.

7. The method of claim 1, wherein the determining of the difficulty comprises reading bits contained within a blockheader.

8. A system, comprising:
    a hardware processor; and
    a memory device storing instructions that, when executed by causing the hardware processor, perform operations, the operations comprising:
    receiving electronic cryptocurrency transactions recorded to a block of data associated with a cryptocurrency;
    mining the electronic cryptocurrency transactions based on a hashing of the block of data using a hashing algorithm;
    determining a difficulty specified by the block of data associated with the cryptocurrency;
    determining a hashrate associated with the mining of the electronic cryptocurrency transactions;
    generating a variable cryptographic interest rate for a digital derivative based on the difficulty and the hashrate; and
    recording the variable cryptographic interest rate to a blockchain associated with the cryptocurrency.

9. The system of claim 8, wherein the operations further comprise calculating a payment associated with the digital derivative based on the variable cryptographic interest rate.

10. The system of claim 9, wherein the operations further comprise recording the payment associated with the digital derivative to the blockchain associated with the cryptocurrency.

11. The system of claim 8, wherein the operations further comprise calculating a schedule of payments associated with the digital derivative based on the variable cryptographic interest rate.

12. The system of claim 11, wherein the operations further comprise recording the schedule of payments associated with the digital derivative to the blockchain associated with the cryptocurrency.

13. The system of claim 8, wherein the operations further comprise increasing the variable cryptographic interest rate in response to a decreasing value of the hashrate associated with the mining of the electronic cryptocurrency transactions.

14. The system of claim 8, wherein the operations further comprise decreasing the variable cryptographic interest rate in response to an increasing value of the hashrate associated with the mining of the electronic cryptocurrency transactions.

15. The system of claim 8, wherein the operations further comprise reading the difficulty from a blockheader of the block of data.

16. The system of claim 8, wherein the operations further comprise reading bits contained within a blockheader of the block of data to determine the difficulty.

* * * * *